(12) United States Patent
Wang et al.

(10) Patent No.: US 8,494,340 B2
(45) Date of Patent: Jul. 23, 2013

(54) METHOD AND ELECTRONIC DEVICE FOR SURVEILLANCE CONTROL

(75) Inventors: Chi-Chih Wang, Taipei Hsien (TW); Quan-Zhong Zhang, Shenzhen (CN); Xiao Cai, Shenzhen (CN); Xiao-Kang Lu, Shenzhen (CN)

(73) Assignees: GDS Software (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 422 days.

(21) Appl. No.: 12/849,757

(22) Filed: Aug. 3, 2010

(65) Prior Publication Data

US 2011/0158602 A1    Jun. 30, 2011

(30) Foreign Application Priority Data

Dec. 30, 2009 (CN) .......................... 2009 1 0312814

(51) Int. Cl.
*H04N 5/765* (2006.01)
*H04N 5/931* (2006.01)

(52) U.S. Cl.
USPC ............................................ 386/200; 386/204

(58) Field of Classification Search
None
See application file for complete search history.

(56) References Cited

U.S. PATENT DOCUMENTS 8,085,298 B2 * 12/2011 Ishigami et al. .............. 348/116
8,195,343 B2 *  6/2012 Lin .................................. 701/2

* cited by examiner

*Primary Examiner* — William C Vaughn, Jr.
*Assistant Examiner* — Oluwaseun A Adegeye
(74) *Attorney, Agent, or Firm* — Altis Law Group, Inc.

(57) ABSTRACT

An electronic device connected with at least one digital video camera dynamically monitors an area where the digital video camera covers. The electronic device displays a monitor point tree, where each node corresponds to a digital video camera. The electronic device can dynamically create an icon control component of a selected digital video camera on an electronic map by dragging and dropping the node corresponding to the one selected on a electronic map. The electronic device can play a video feed of the digital video camera by clicking on the created icon control component.

19 Claims, 9 Drawing Sheets

METHOD AND ELECTRONIC DEVICE FOR SURVEILLANCE CONTROL

BACKGROUND

1. Technical Field

Embodiments of the present disclosure relate to user interfaces, and more particularly to an electronic device and method for surveillance control thereof.

2. Description of Related Art

Vendors of surveillance devices rarely adopt unified surveillance system software. Incompatibilities among surveillance systems cause different surveillance devices difficulties in sharing and communication information with one another. In addition, controls of surveillance systems are usually rigid and not user friendly.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, for example, Java, C, or assembly. One or more software instructions in the module may be integrated in firmware, such as an EPROM. It will be appreciated that module may comprise connected logic units, such as gates and flip-flops, and may comprise programmable units, such as programmable gate arrays or processors. The units described herein may be implemented as software and/or hardware unit and may be stored in any type of computer-readable medium or other computer storage device.

Figure 1:
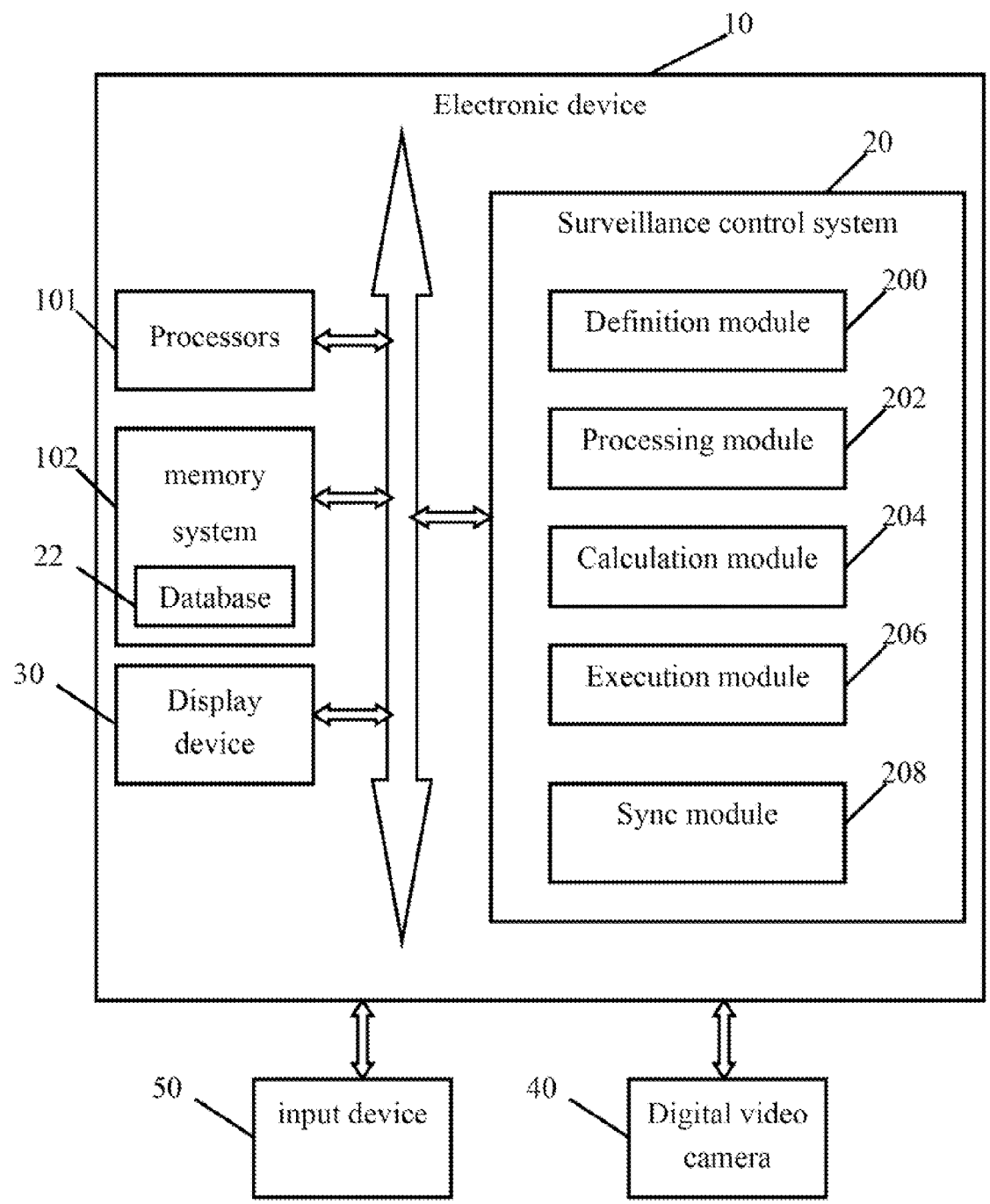
FIG. 1 is a block diagram of one embodiment of an electronic device providing surveillance control.

FIG. 1 is a block diagram of an electronic device 10 comprising a display device 30 and a surveillance control system 20. The electronic device 10 is electronically connected with at least one digital video recorder 40 and an input device 50. The digital video recorder 40 is connected with the electronic device 10 via a communication network. The communication network can be a local area network, a personal area network, WIFI, or the Internet, for example. The input device 50 may be a keyboard and a mouse connected to the electronic device 10, for example, to conduct data registration for the electronic device 10. The electronic device 10 further comprises a memory system 102 to store a database 22 which contains names and locations of monitor points. In the embodiment, the monitor points represents the at least one digital video recorder 40 on an electronic map. One monitor point corresponds to one digital video recorder 40. Depending on the embodiment, the electronic device 10 can be a personal computer, or a notebook, for example.

The system 20 includes a display module 200, a set-up module 202, a generation module 204, a storage module 206, and a surveillance module 208. One or more computerized codes of the modules 200-208 are stored in the memory system 102 and executed by one or more processors 101 of the electronic device 10.

In the embodiment, the display module 200 is operable to display the monitor points on the display device 30. The monitor points are maintained with a tree data-structure according to a hierarchy of geographic locations of the at least one digital video recorder 40. For example, Shenzhen/Long-Hua/B3/$3^{rd}$ floor means a monitor point at the $3^{rd}$ floor of building B3, in Long Hua district, in Shenzhen, wherein the $3^{rd}$ floor is a leaf node of the tree data-structure. The monitor points are stored in the memory system 102 using the database 22.

In the embodiment, the set-up module 202 is operable to set up the electronic map for the monitor points and to save the electronic map in the database 22. The display module 200 displays the electronic map on the device 30. In the embodiment, the monitor point is a leaf node of the tree data-structure.

In the embodiment, the generation module 204 generates an Icon control component for a selected monitor point in the electronic map, in response to a drag and drop operation on the selected monitor point. In addition, the generation module 204 changes the position of the generated Icon control component on the electronic map using the drag and drop operation. The Icon control component is an assembly of certain icon control component components of MICROSOFT .NET Framework encapsulated by the generation module 204.

In the embodiment, the storage module 206 is operable to store an identifier (ID) of the Icon control component in the database 22 stored in the memory system 102, in response to a confirmation of the position of the icon control component on the electronic map from the user. In the embodiment, the confirmation can be a click on a "save" button on the electronic map. The display module 200 displays the Icon control component stored previously on the display device 30.

In the embodiment, the surveillance module 208 is operable to connect to the digital video recorder 40 via the communication network, in response to a click event of the input device 50. The click event is associated with the Icon control component by the generation module 204 upon generation.

Figure 2:
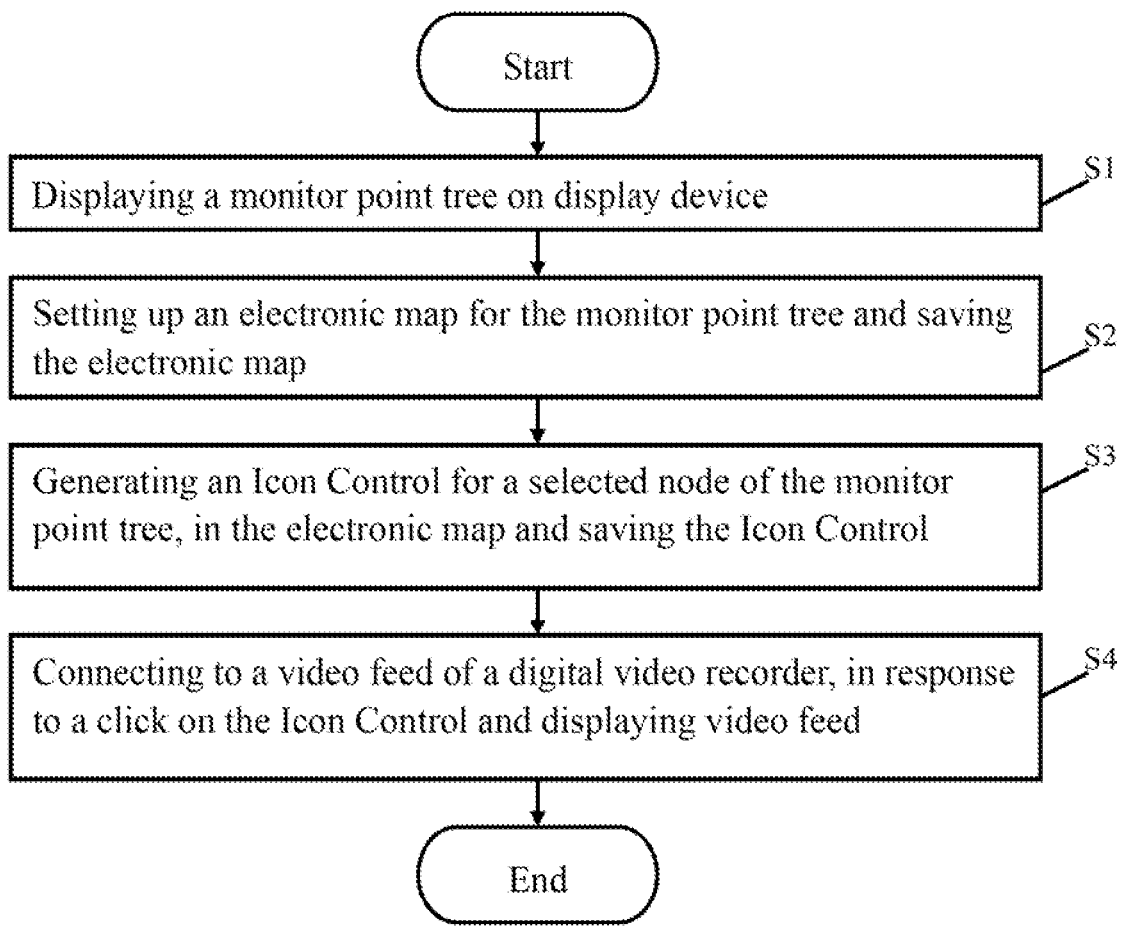
FIG. 2 is a flowchart illustrating one embodiment of a method for surveillance control.

FIG. 2 is a flowchart of one embodiment of a method for surveillance control of the electronic device 10. Depending on the embodiments, additional blocks may be added, others removed, and the ordering of the blocks may be changed.

In block S1, the display module 200 displays the monitor point tree on the display device 30. In block S2, the set-up module 202 sets up the electronic map for the monitor point tree and saves the electronic map in the database 22 stored in the memory system 102 of the electronic device 10. The display module 200 displays the electronic map on the device 30. In block S3, the generation module 204 generates the Icon control component for the selected node of the monitor point tree, in the electronic map, in response to a drag and drop operation of the input device 50 on the selected node. In addition, the generation module 204 can change the position of the generated Icon control component on the electronic map using the drag and drop operation. In the embodiment, the display module 200 displays the Icon control component stored previously on the display device 30. In block S4, the surveillance module 208 connects to the video feed of the digital video recorder 40, in response to a click event of the input device 50. The surveillance module 208 shows a video feed page. The display module 200 plays the video feed of the digital video recorder on the video feed page.

Figure 3:
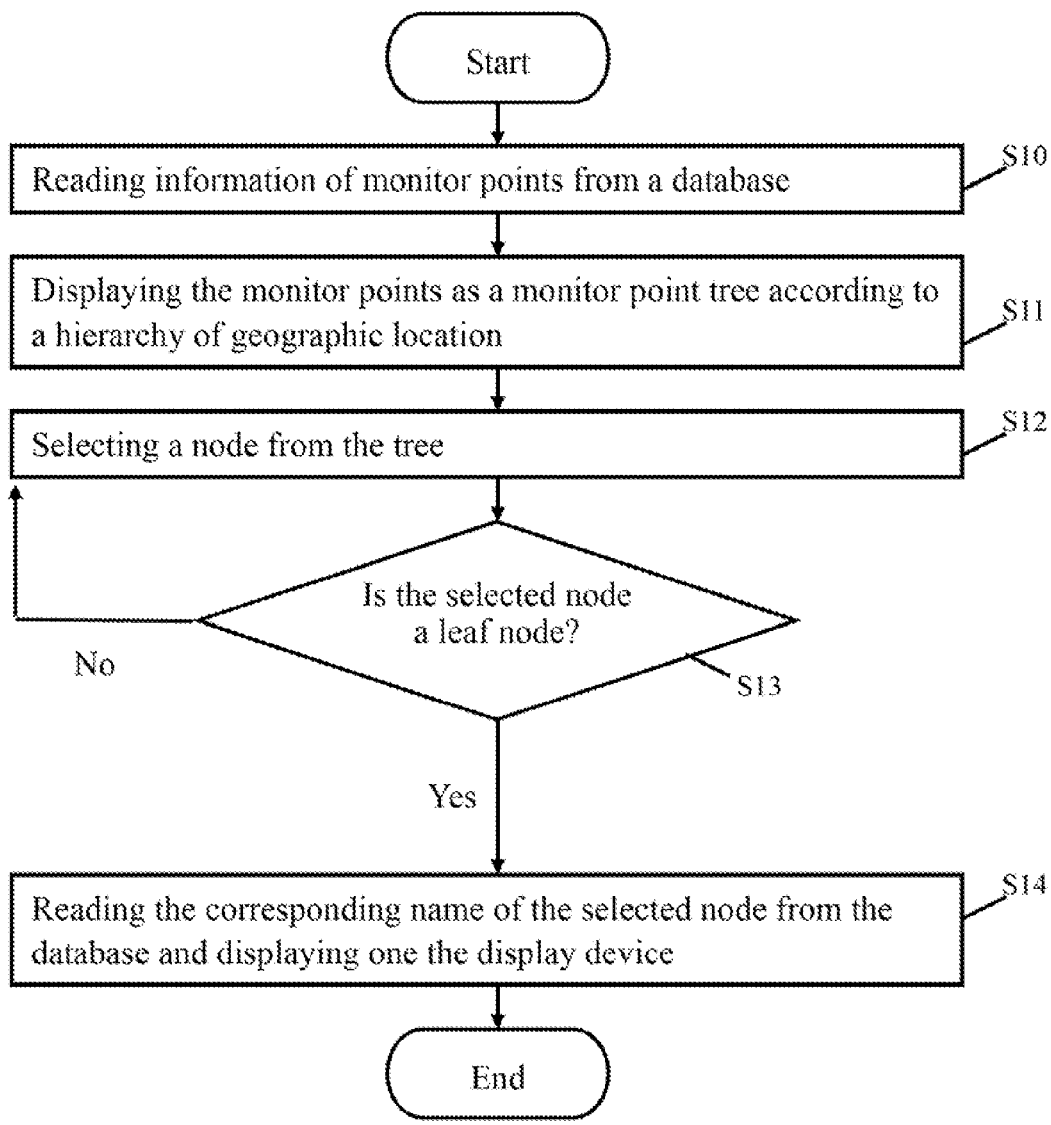
FIG. 3 is a flowchart illustrating one embodiment of step S1 in FIG. 2.

FIG. 3 is a flowchart illustrating one embodiment of step S1 in FIG. 2. In block 10, the display module 200 reads the information of each monitor point from the database 22 stored in the memory system 102 of the electronic device 10. In the embodiment, the information includes names and locations of the monitor points. In block 11, the display module 200 binds each monitor point to the node of the tree data-structure according to the hierarchy of geographic location of the digital video recorder 50 and displays the nodes as the monitor point tree on the display device 30. In the embodiment, the tree data-structure is implemented with UltraWebTree, a component of MICROSOFT .NET Framework. In block 12, a user selects a node from the tree structure using the input device 50. In block 13, the display module 200 verifies if the selected node is a leaf node. If the selected node is a leaf node, the process goes to block S14. If the selected node is not a leaf node, the process goes back to block S12. In block S14, the display module reads the corresponding name of the selected node from the database 22 and displays the corresponding name on the display device 30.

Figure 4:
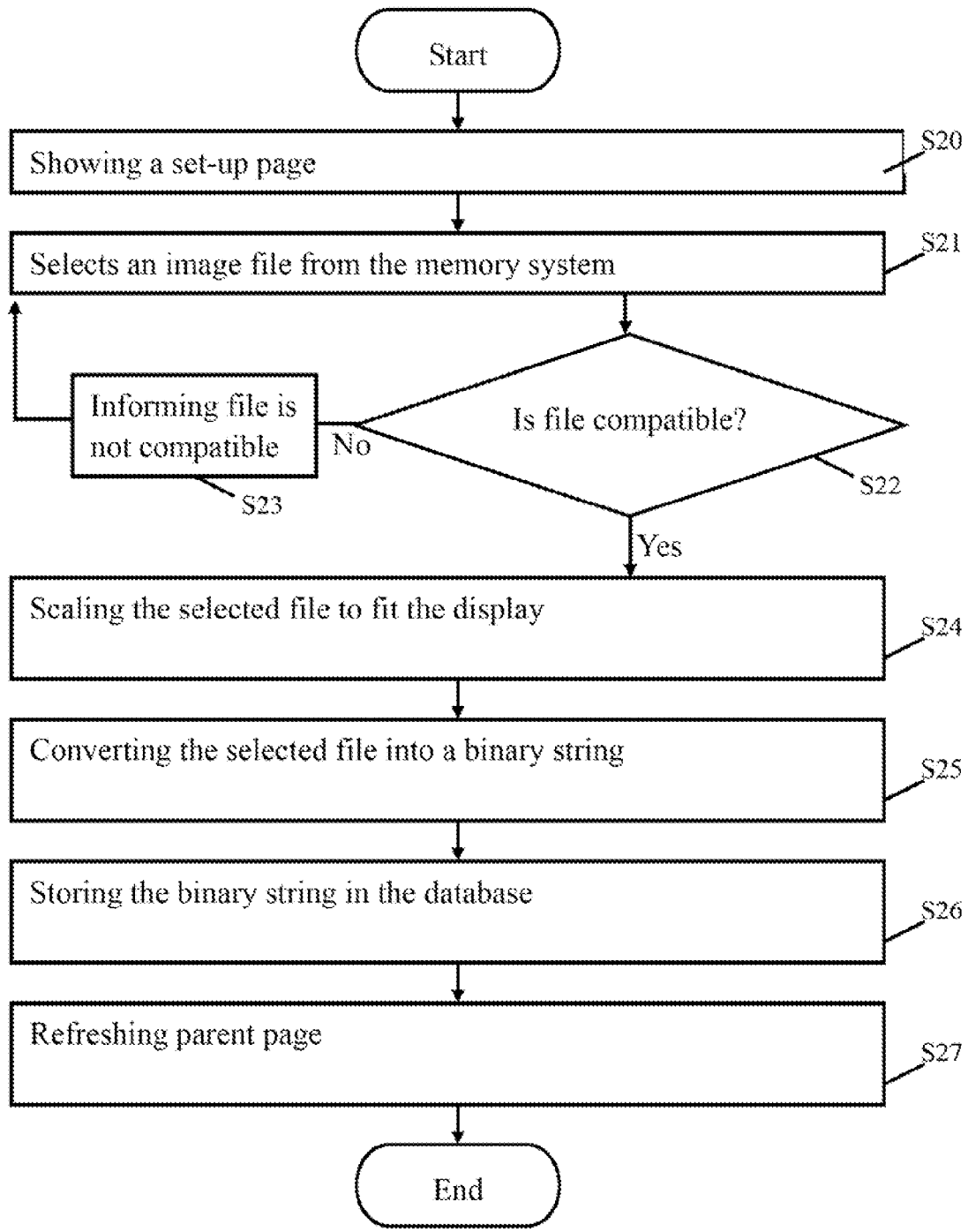
FIG. 4 is a flowchart illustrating one embodiment of step S2 in FIG. 2.

FIG. 4 is a flowchart illustrating one embodiment of step S2 in FIG. 2. In block 20, the set-up module 202 shows a set-up page. In block S21, the set-up module 202 selects an image file from the memory system 102 using a FileUpload component of MICROSOFT .NET Framework, in response to a click on a "set up electronic map" button on the set-up page. In the embodiment, the image file is the electronic map file. In block S22, the set-up module 202 verifies if the format of selected file is compatible using a RegularExpressionValidator component of MICROSOFT .NET Framework. If the format is compatible, the process goes to block S24. Otherwise, the process goes to block S23. In the embodiment, the compatible image file formats are GIF, PNG, JPG, and BMP. In block S23, the set-up module 202 informs the user that the selected file is not compatible, and the process goes back to block S21. In block S24, the set-up module 202 scales the selected file to fit the display device 30 of the electronic device 10, 70% smaller for example, using an AlphaImageLoader component of MICROSOFT .NET Framework. In block S25, the set-up module 202 converts the selected file into a binary string, using a predetermined conversion function In block S26, the set-up module 202 stores the binary string in the database 22, using a predetermined save function, in response to a click on a "save map" button on the set-up page. In block S27, the display module 200 refreshes the parent page, using a refresh function to display the saved file.

Figure 5:
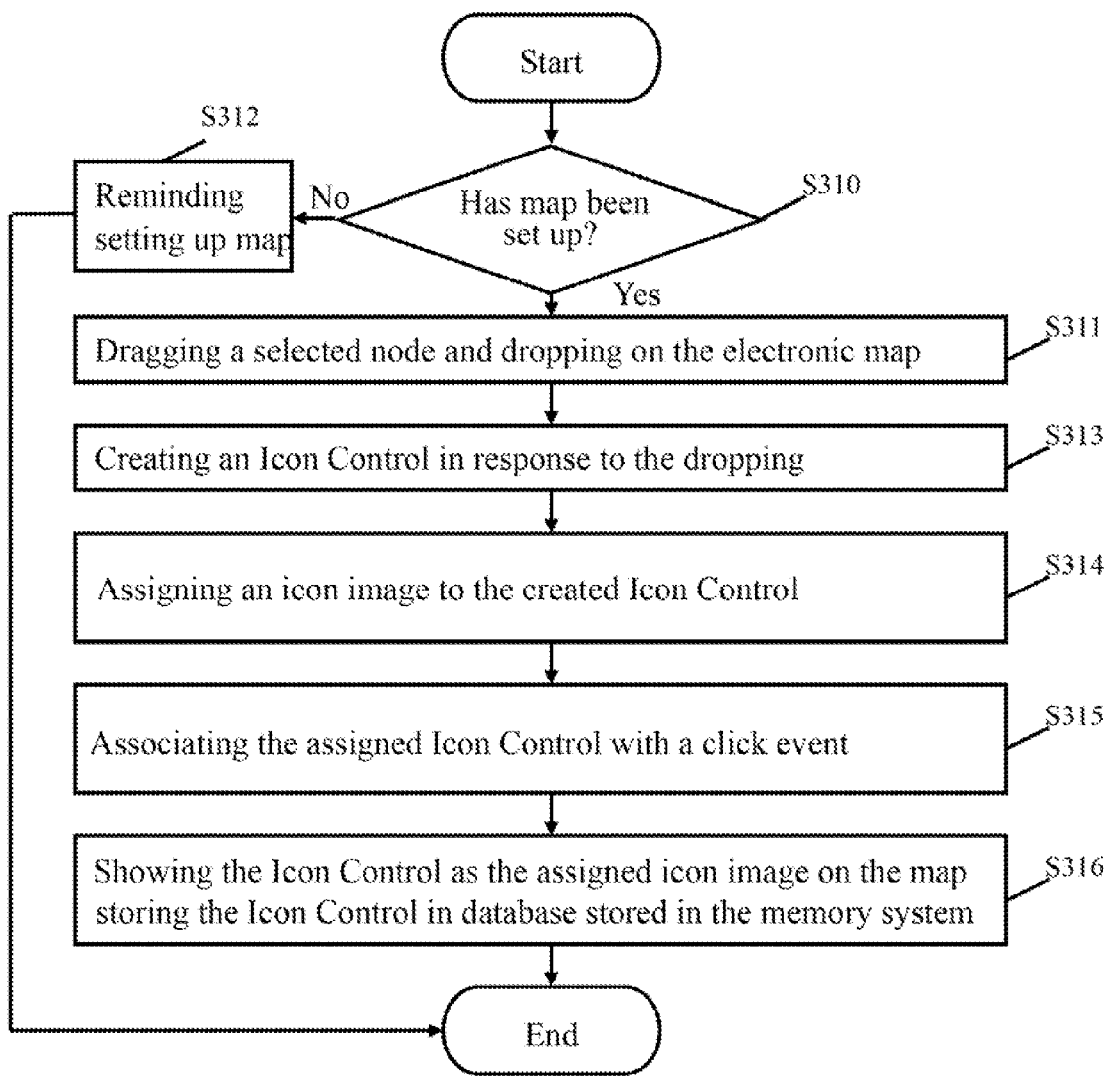
FIG. 5 is a flowchart illustrating one embodiment of step S3 of FIG. 2.

FIG. 5 is a flowchart illustrating one embodiment of step S3 of FIG. 2. In block S310, the generation module 204 verifies if the electronic map has been set up. If the electronic map has been set up, the process goes to S311. Otherwise, the process goes to S312. In block S312, the generation module 204 reminds the user to set up the electronic map before proceeding and the process ends. In block S311, the user drags a selected node of the monitor point tree to the electronic map and drops the selected node on the electronic map, using the input device 50. The generation module 204 stores information of the Icon control component in the memory system 102. In the embodiment, the information includes an ID and position of the Icon control component, wherein the ID consists of the string "pic" concatenated with the name of the selected node and the position is where the user drops the node. In block S313, the generation module 204 creates an Icon control component in response to the drop operation of the input device 50, using JAVA script technology. If the Icon control component has already been generated, the generation module 204 informs the user that the Icon control component has already been generated. In block S314, the generation module 204 assigns an icon image to the created Icon control component. In block S314, the generation module 204 associates the assigned Icon control component with a click event using MICROSOFT .NET Framework. In the block S316, the display module 200 shows the Icon control component as the assigned icon image on the electronic map on the position thereof.

Figure 6:
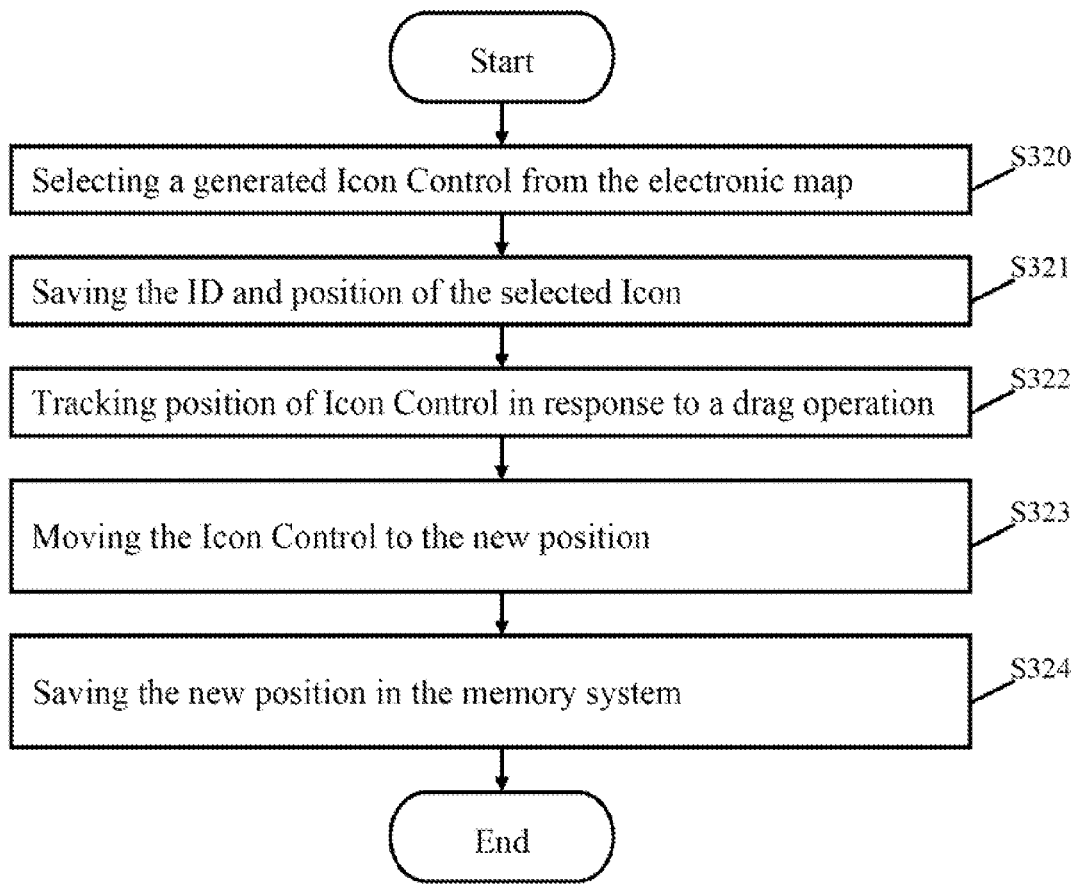
FIG. 6 is a flowchart illustrating one embodiment of a method for changing the position of an Icon control component.

FIG. 6 is a flowchart illustrating one embodiment of a method for changing the position of the Icon control component on the electronic map. In block S320, the user selects a generated Icon control component from the electronic map. In block S321, the generation module 204 saves the ID and position of the selected Icon. In block S322, the generation module 204 tracks the present position of Icon control component in response to the drag operation. In block S323, the generation module 204 moves the Icon control component to the present position using a transpose function call, in response to the drop operation. In block S324, the generation module 204 saves the new position to the position entry of the generated Icon control component in the database 22 stored in the memory system 102 of the electronic device 10, in response to the drop operation.

Figure 7:
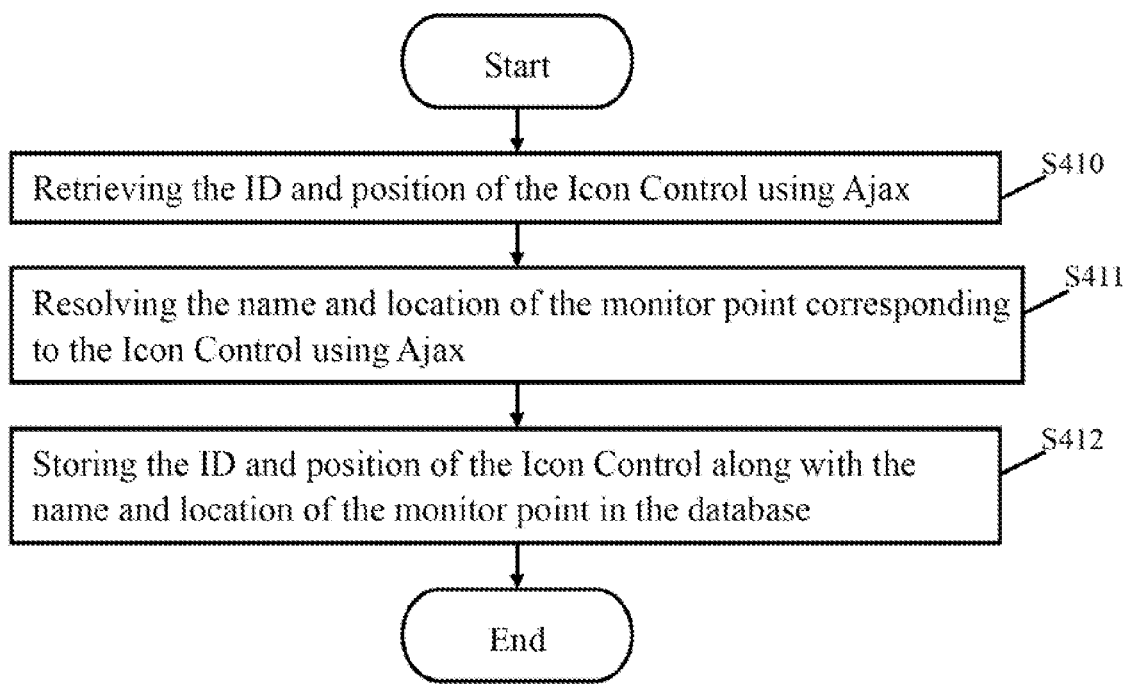
FIG. 7 is a flowchart illustrating one embodiment of step S316 of FIG. 5.

FIG. 7 is a flowchart illustrating one embodiment of step S316 of FIG. 5. In block S410, the storage module 206 retrieves the ID and position of the Icon control component, in response to the click on the "save" button on the set-up page. In block S411, the storage module 206 resolves the name and location of the monitor point corresponding to the Icon control component using Ajax technology. In block S412, the storage module 206 stores the ID and position of the Icon control component along with the name and location of the monitor point in the database 22 stored in the memory system 102 of the electronic device 10.

Figure 8:
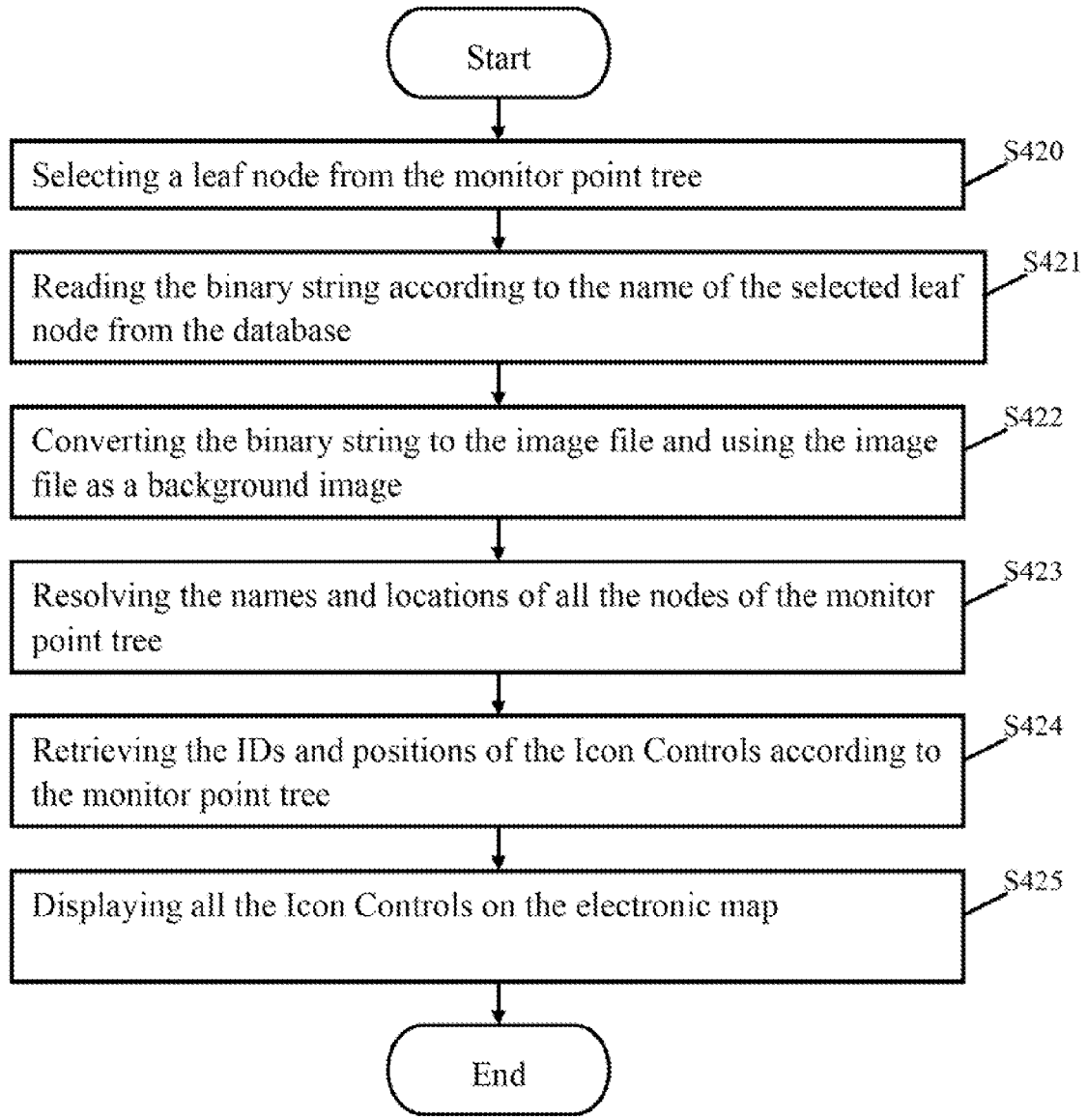
FIG. 8 is a flowchart illustrating one embodiment of a method for displaying the Icon control component.

FIG. 8 is a flowchart illustrating one embodiment of a method for displaying the Icon control component. In block S420, the user selects a leaf node from the monitor point tree. In block 421, the display module 200 reads the binary string according to the name of the selected leaf node from the database 22. In block S422, the display module 200 converts the binary string to the image file and uses the image file as a background image. In block S423, the display module 200 resolves the names and locations of all the nodes of the monitor point tree. In block S424, the display module 200 retrieves the IDs and positions of the Icon control components according to the monitor point tree. In block S425, all the Icon control components are displayed on the electronic map.

Figure 9:
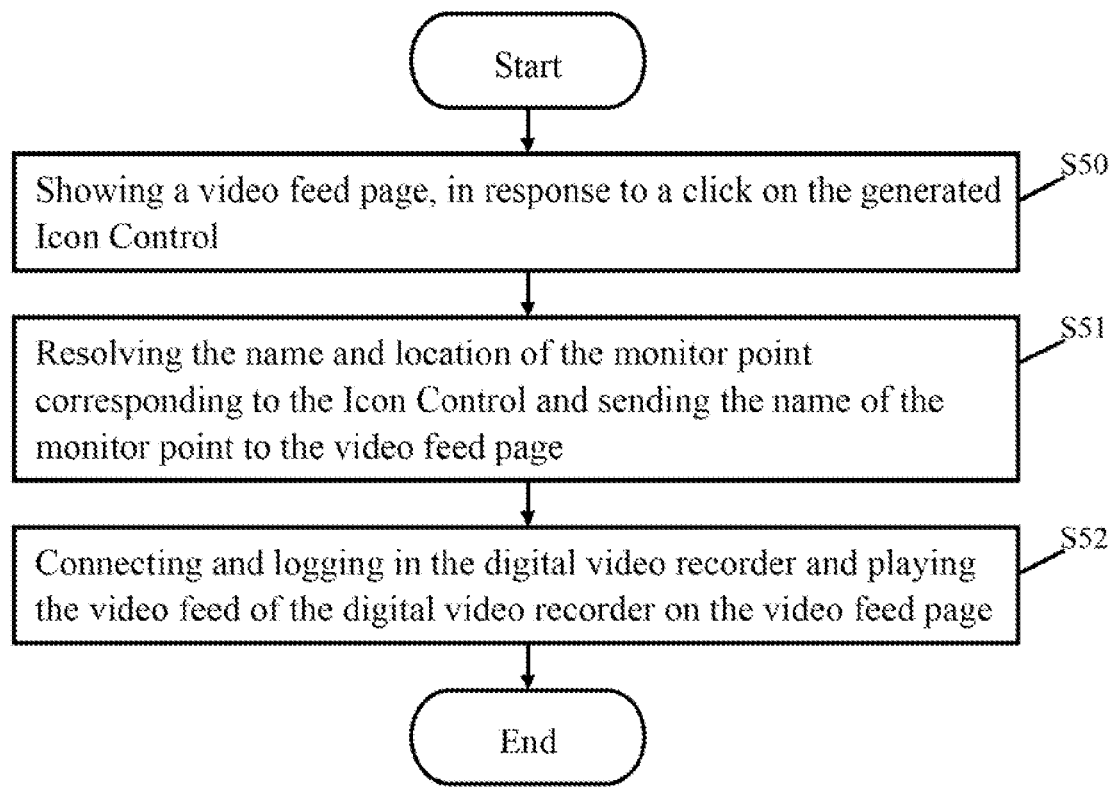
FIG. 9 is a flowchart illustrating one embodiment of step S4 in FIG. 2.

FIG. 9 is a flowchart illustrating one embodiment of step S4 in FIG. 2. In block S50, the surveillance module 208 shows a video feed page, in response to a click on the generated Icon control component on the electronic map. In block S51, the display module 200 resolves the name and location of the monitor point corresponding to the clicked Icon control component and sends the name of the monitor point to the video feed page. In block S52, the surveillance module 208 connects and logs in the digital video recorder 40 and the display module 200 plays the video feed of the digital video recorder 40 on the video feed page, using Software Development Kit (SDK) of the digital video recorder 40.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device electronically connected with at least one digital video recorder, comprising:
   a memory system;
   one or more processors; and
   one or more programs stored in the memory system configured to be executed by the one or more processors, the one or more programs comprising:
   a set-up module to set up an electronic map for a monitor point tree, wherein each node of the monitor point tree is a monitor point and corresponds to one of the at least one digital video recorder, and to save the electronic map and the monitor point tree in a database stored in the memory system of the electronic device, the monitor points being maintained with a tree data-structure according to a hierarchy of a geographic location of the at least one digital video recorder;
   a generation module to generate an icon control component for a selected node of the monitor point tree in the electronic map, and to associate the icon control component with a click event of an input device electronically connected to the electronic device;
   a storage module to save an identifier (ID) of the icon control component and a position of the icon control component on the electronic map in the database;
   a surveillance module to connect to one of the at least one digital video recorder corresponding to the selected node via a communication network, in response to the click event; and
   a display module to control a display device of the electronic device to display the electronic map, the monitor point tree, the icon control component, and a video feed from the connected digital video recorder.

2. A computerized method of an electronic device electronically connected with at least one digital video recorder, comprising:
   setting up an electronic map for a monitor point tree, wherein each node of the monitor point tree is a monitor point and corresponds to one of the at least one digital video recorder, the monitor points being maintained with a tree data-structure according to a hierarchy of a geographic location of the at least one digital video recorder;
   selecting a node from the monitor point tree using an input device electronically connected to the electronic device;
   generating an icon control component for a selected node of the monitor point tree in the electronic map, and associating the icon control component with a click event of an input device electronically connected to the electronic device;
   saving an identifier (ID) of the icon control component and a position of the icon control component on the electronic map in the database;
   connecting to one of the at least one digital video recorder corresponding to the selected node via a communication network, in response to the click event;
   displaying the monitor point tree on a display device of the electronic device;
   displaying the electronic map and the icon control component on the display device; and
   displaying a video feed from the connected digital video recorder on the display device;
   wherein the monitor point tree, the icon control component, and the electronic map are saved in a database stored in a memory system of the electronic device.

3. The computerized method as claimed in claim 2, wherein each monitor point comprises a name and location of the corresponding digital video recorder, and the step of displaying the monitor point tree further comprising:
   reading the corresponding name and location of each monitor point from the database stored in the memory system of the electronic device;
   binding each monitor point to an empty monitor point tree according to a hierarchy of the corresponding location;
   displaying the monitor point tree on the display device of the electronic device; and
   displaying the corresponding name on the display device, in response to the select operation using the input device.

4. The computerized method as claimed in claim 2, wherein the step of setting up the electronic map further comprising:
   displaying a set-up page;
   selecting an image file from the memory system of the electronic device, wherein the image file is the electronic map file;
   verifying compatibility of the selected file;
   informing the selected file is not compatible;
   scaling the selected file to fit the display device of the electronic device;
   converting the selected file into a binary string using a predetermined transform function;
   saving the binary string in the database stored in the memory system; and
   refreshing a parent page of the set-up page to display the saved file.

5. The computerized method as claimed in claim 2, wherein the step of generating the icon control component further comprising:
   verifying existence of the electronic map;
   reminding the user to set up the electronic map prior to proceeding;
   dragging the selected node to the electronic map and dropping the selected node thereon, using the input device;
   generating the icon control component for the selected node, in response to the drop operation;
   saving the ID of the icon control component and where the selected node is dropped on the electronic map as the position of the icon control component in the database stored in the memory system of the electronic device, in response to the drop operation;
   assigning an icon image to the generated icon control component;
   associating the icon control component with the click event of the input device; and
   displaying the icon control component as the assigned icon image on the electronic map on the position thereof.

6. The computerized method as claimed in claim 2, wherein the method further comprises a step of changing the position of icon control component on the electronic map, comprising:
   selecting the generated icon control component from the electronic map;

dragging the generated icon control component on the electronic map and dropping the generated icon control component on a new position on the electronic map, using the input device; and saving the new position to the position entry of the generated icon control component in the database stored in the memory system of the electronic device, in response to the drop operation.

7. The computerized method as claimed in claim 5, wherein the step of storing the icon control component further comprising:

retrieving the ID and position of the icon control component;

resolving the name and location of the corresponding monitor point; and storing the ID and position of the icon control component along with the name and location of the monitor point in the database stored in the memory system of the electronic device.

8. The computerized method as claimed in claim 2, wherein the step of displaying the video feed comprising:

clicking on the generated icon control component;

displaying a video feed page;

resolving the name and location of the monitor point corresponding to the clicked icon control component and sends the name to the video feed page;

connecting and logging in to the digital video recorder corresponding to the resolved monitor point via a communication network; and playing the video feed of the digital video recorder on the video feed page.

9. The electronic device as claimed in claim 1, wherein each monitor point comprises a name and location of the corresponding digital video recorder, and the display module displays the monitor point tree by:

reading the corresponding name and location of each monitor point from the database stored in the memory system of the electronic device;

binding each monitor point to an empty monitor point tree according to a hierarchy of the corresponding location;

displaying the monitor point tree on the display device of the electronic device; and displaying the corresponding name on the display device, in response to the select operation using the input device.

10. The electronic device as claimed in claim 1, wherein the set-up module sets up the electronic map by:

displaying a set-up page;

selecting an image file from the memory system of the electronic device, wherein the image file is the electronic map file;

verifying compatibility of the selected file;

informing the selected file is not compatible;

scaling the selected file to fit the display device of the electronic device;

converting the selected file into a binary string using a predetermined transform function;

saving the binary string in the database stored in the memory system; and refreshing a parent page of the set-up page to display the saved file.

11. The electronic device as claimed in claim 1, wherein the generation module further operable to change the position of icon control component on the electronic map by:

selecting the generated icon control component from the electronic map;

dragging the generated icon control component on the electronic map and dropping the generated icon control component on a new position on the electronic map, using the input device; and saving the new position to the position entry of the generated icon control component in the database stored in the memory system of the electronic device, in response to the drop operation.

12. The electronic device as claimed in claim 1, wherein the storage module stores the icon control component by:

retrieving the ID and position of the icon control component;

resolving the name and location of the corresponding monitor point; and storing the ID and position of the icon control component along with the name and location of the monitor point in the database stored in the memory system of the electronic device.

13. A non-transitory computer readable storage medium having stored therein instructions, that when executed by one or more processors of an electronic device connected to at least one digital video recorder, cause the device to:

set up an electronic map for a monitor point tree, wherein each node of the monitor point tree is a monitor point and corresponds to one of the at least one digital video recorder, the monitor points being maintained with a tree data-structure according to a hierarchy of a geographic location of the at least one digital video recorder;

select a node from the monitor point tree using an input device electronically connected to the electronic device;

generate an icon control component for a selected node of the monitor point tree in the electronic map, and associating the icon control component with a click event of an input device electronically connected to the electronic device;

saving an identifier (ID) of the icon control component and a position of the icon control component on the electronic map in the database;

connecting to one of the at least one digital video recorder corresponding to the selected node via a communication network, in response to the click event;

display the monitor point tree on a display device of the electronic device;

display the electronic map and the icon control component on the display device; and display a video feed from the connected digital video recorder on the display device;

wherein the monitor point tree, the icon control component, and the electronic map are saved in a database stored in a memory system of the electronic device.

14. The non-transitory computer readable storage medium as claimed in the claim 13, wherein each monitor point comprises a name and location of the corresponding digital video recorder, and the step of displaying the monitor point tree further comprising:

reading the corresponding name and location of each monitor point from the database stored in the memory system of the electronic device;

binding each monitor point to an empty monitor point tree according to a hierarchy of the corresponding location;

displaying the monitor point tree on the display device of the electronic device; and displaying the corresponding name on the display device, in response to the select operation using the input device.

15. The non-transitory computer readable storage medium as claimed in the claim 13, wherein the step of setting up the electronic map further comprising:

displaying a set-up page;
selecting an image file from the memory system of the electronic device, wherein the image file is the electronic map file;
verifying compatibility of the selected file;
informing the selected file is not compatible;
scaling the selected file to fit the display device of the electronic device;
converting the selected file into a binary string using a predetermined transform function;
saving the binary string in the database stored in the memory system; and
refreshing a parent page of the set-up page to display the saved file.

16. The non-transitory computer readable storage medium as claimed in the claim 13, wherein the step of generating the icon control component further comprising:
   verifying existence of the electronic map;
   reminding the user to set up the electronic map prior to proceeding;
   dragging the selected node to the electronic map and dropping the selected node thereon, using the input device;
   generating the icon control component for the selected node, in response to the drop operation;
   saving the ID of the icon control component and where the selected node is dropped on the electronic map as the position of the icon control component in the database stored in the memory system of the electronic device, in response to the drop operation;
   assigning an icon image to the generated icon control component;
   associating the icon control component with the click event of the input device; and
   displaying the icon control component as the assigned icon image on the electronic map on the position thereof.

17. The non-transitory computer readable storage medium as claimed in the claim 13, wherein the method further comprises a step of changing the position of icon control component on the electronic map, the step comprising:
   selecting the generated icon control component from the electronic map;
   dragging the generated icon control component on the electronic map and dropping the generated icon control component on a new position on the electronic map, using the input device; and
   saving the new position to the position entry of the generated icon control component in the database stored in the memory system of the electronic device, in response to the drop operation.

18. The non-transitory computer readable storage medium as claimed in the claim 16, wherein the step of storing the icon control component further comprising:
   retrieving the ID and position of the icon control component;
   resolving the name and location of the corresponding monitor point; and
   storing the ID and position of the icon control component along with the name and location of the monitor point in the database stored in the memory system of the electronic device.

19. The non-transitory computer readable storage medium as claimed in the claim 13, wherein the step of displaying the live video feed further comprising:
   clicking on the generated icon control component;
   displaying a video feed page;
   resolving the name and location of the monitor point corresponding to the clicked icon control component and sends the name to the video feed page;
   connecting and logging in to the digital video recorder corresponding to the resolved monitor point via a communication network; and
   playing the video feed of the digital video recorder on the video feed page.

* * * * *